Sept. 4, 1923. Re. 15,683
P. W. PETERSEN
METHOD AND APPARATUS FOR HANDLING COMESTIBLES
Original Filed Oct. 12, 1921
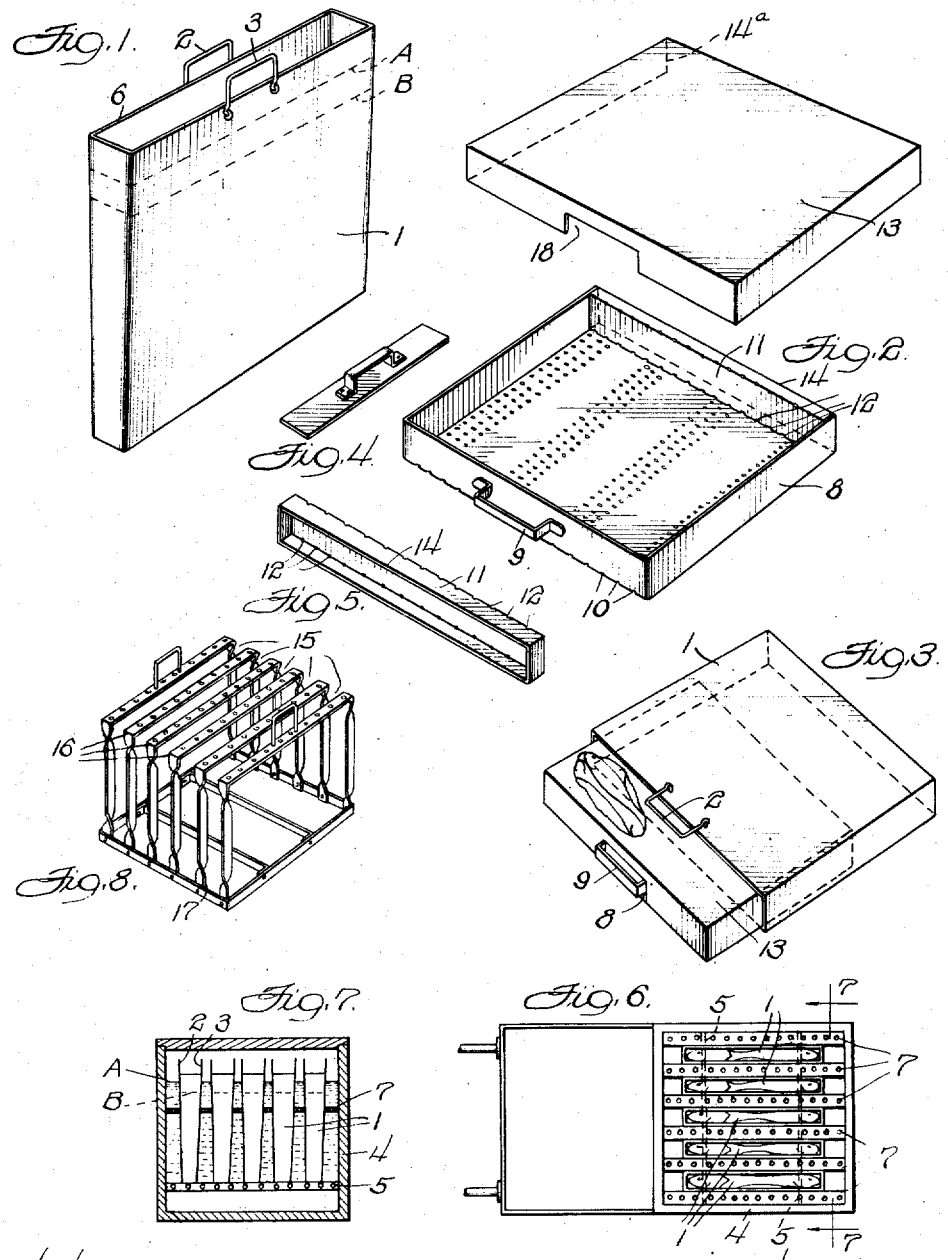
Witness:
P. H. Haselton
Inventor:
PAUL W. PETERSEN
By Jones, Addington, Ames & Seibold
Attys.

Reissued Sept. 4, 1923. Re. 15,683

UNITED STATES PATENT OFFICE.

PAUL W. PETERSEN, OF BAY CITY, MICHIGAN.

METHOD AND APPARATUS FOR HANDLING COMESTIBLES.

Original No. 1,422,126, dated July 11, 1922, Serial No. 507,170, filed October 12, 1921. Application for reissue filed June 16, 1923. Serial No. 645,895.

*To all whom it may concern:*

Be it known that I, PAUL W. PETERSEN, a subject of the Kingdom of Denmark, residing at Bay City, in the county of Bay and State of Michigan, United States of America, have invented new and useful Improvements in Methods and Apparatus for Handling Comestibles, of which the following is a full, clear, concise, and exact description, reference being had to the accompanying drawing, forming a part of this specification.

My invention relates to a method of, and an apparatus for, preserving comestibles by refrigeration whereby the comestibles may be expeditiously and conveniently handled in large quantities and be subjected to the action of a liquid refrigeration without having them suffer any deleterious effects.

More particularly my invention relates to a method of handling and means for refrigerating comestibles, such as fish or cuts of meat, in large quantities by immersing them in a noncongealing freezing liquid, such as brine.

I am aware that it has been proposed to freeze comestibles by partly or wholly immersing them in a cold brine, either with or without a water-tight covering so as to prevent direct contact with the brine. Also, it has been proposed to dispose a comestible in a water-tight box of such size to just contain the comestible which is to be frozen or cooled, such a box being wholly or partially immersed in a liquid refrigerant. Again, it has been suggested to hang or dump fish in cans, such as ice cans, which are thereafter filled with water and then dipped into a brine bath in a manner similar to that employed in the making of artificial ice. With such freezing cans refrigeration is effected in a very short time and then the cans are subjected to thawing water in order to remove the frozen mold by slightly thawing it. The disadvantages of the foregoing methods of freezing comestibles are apparent, and it is pertinent to remark that none of these several methods of handling comestibles has been adopted on a commercial scale by reason of inherent defects which preclude the economical practicing of them.

By means of my present invention comestibles, such as fish and cuts of meat and the like, may be conveniently packed tightly in suitable containers or holders wherein they may be arranged to occupy minimum space and whereby interposed air spaces in the pack are substantially minimized. Through the practicing of my present invention, fish and other comestibles may be economically and rapidly refrigerated by submitting them to a very close and intimate contact with the liquid that serves as the agency through which the comestibles are refrigerated. While the comestibles treated in accordance with my invention are subjected to the action and influence of a liquid refrigerant, they are prevented from coming in direct contact with this liquid which might affect them deleteriously, possibly making them unsuitable for use as edibles.

To the accomplishment of the aforementioned objects and others to be hereinafter pointed out, my invention is directed and for a better understanding of the same, reference may be had to the following description and to the accompanying drawing, in which—

Figure 1 is a perspective view of a containing can wherein comestibles may be refrigerated in accordance with my invention;

Fig. 2 is a perspective view showing a pan and cover constituting one form of a container in which comestibles, particularly fish, may be closely packed with convenience and without undue labor;

Fig. 3 is a view showing the container of Fig. 2, being placed in position in the can of Fig. 1;

Fig. 4 is a trowel-like device which may be used in packing the fish;

Fig. 5 is a bottom view of a false bottom which may be used in conjunction with the can of Fig. 1 and the container of Fig. 2;

Figs. 6 and 7 are plan and side views, somewhat diagrammatic, showing a vat in which comestibles may be refrigerated in accordance with my invention; and Fig. 8 is a perspective view of a rack in which a number of the cans of Fig. 1 may be disposed for convenience in handling them during the refrigerating operation.

Referring to the drawing, the can of Fig. 1 is a water-tight and preferably narrow closure made of any suitable material, preferably sheet metal. The can 1 is so constructed that it tapers slightly convergingly from its open top towards its closed bottom in order that any frozen mold contained therein may be easily removed. The top of the can 1 is open and therethrough the comestibles to be refrigerated are received. The can 1 is provided with oppositely disposed handles 2 and 3 which permit of convenient handling of the can The cans 1, as shown in Figs. 6 and 7, are arranged vertically in a vat or tank 4 of any suitable construction which contains the liquid refrigerant in which the cans are immersed. The cans 1, when immersed in the liquid, are spaced from one another, as shown, in order to permit of the refrigerant coming in direct contact with the largest effective areas of the cans 1. Also, the cans 1 may be disposed on a false bottom 5 which is perforated in order to permit the freezing liquid or refrigerating bath to come in direct contact with the bottom areas of the cans 1. It is to be noted that the cans 1 have their upper edges 6 extending above the level of the refrigerating bath. This condition preferably obtains at all times in order to preclude any liquid from entering the cans 1. Perforated partitions 7, which extend longitudinally of the cans 1, as shown best in Fig. 6, serve to space the cans 1 from one another.

Since the can 1 serves as a container for the comestibles which are to be refrigerated without coming in direct contact with the liquid refrigerant, it is necessary in order to economically and conveniently freeze the comestibles, that they be tightly and evenly packed in the can 1 with minimum interposed air spaces. This packing operation should be readily performed in order to make this method of refrigerating a practical commercial one.

For this purpose a container or pan such as is shown in Fig. 2 is provided. The pan 8 of Fig. 2 is a shallow scoop-shape structure having its upper side open and its depth being slightly less than the narrow width of the can 1. It is likewise provided with a handle 9 and the bottom is perforated, such as at 10, in order to drain the pan. A false bottom 11 of Fig. 5 when used in conjunction with the pan 8 may be positioned as illustrated with its upper surface exposed. The false bottom 11 is perforated preferably at 12 along its bent over edges to provide for the draining of the contents of the pan when placed upright. The comestibles to be frozen are tightly packed and arranged in the pan 8 so that the interposed air spaces are minimized. By reason of the shallowness of the pan 8 and its being entirely open and exposed on one of its faces, the comestibles to be refrigerated, such as fish, may be very conveniently packed with little labor so that the comestibles will occupy minimum space. After the comestibles are packed in the pan 8, the telescopic cover 13 may be applied which serves as a closure for the pan. The cover 13 is recessed on one of its edges, as at 18, in order to permit the handle 9 secured to the pan 8 to extend therethrough so that the assembled structure may be conveniently handled.

The pan 8, after being packed with comestibles and, provided with its cover 13 may then be placed within the can 1, as shown in Fig. 3, and wherein it slidingly fits. The walls of the pan 8 and cover 13 are in close intimate contact with the interior walls of the can 1, and, therefore, the can 1 when immersed in the refrigeration vat permits the liquid refrigerant to come into close proximity to the comestibles contained within the pan.

In carrying out my present method of refrigeration, the pans 1 may be immersed in the liquid to a level approximating the position of the line A of Figs. 1 and 7. The tops of the pan 8 and cover 13, when these are properly positioned in the can 1, preferably do not extend higher in the can 1 than a level approximating the line B. In this instance it is to be observed, therefore, that the refrigerant or freezing solution extends above the highest point of the comestibles to be refrigerated although not in direct contact with the comestibles. Although the refrigerant is not in contact with the upper face of the pan 8, it nevertheless is very active because it produces a body of cool air that fills the remaining open space in the can 1. The air in the space is rapidly cooled to a temperature below that of the outside air above the level of the liquid refrigerant and this cold air, being heavier than warmer air, remains in the can. This body of cold air also becomes saturated with moisture absorbed from the comestibles being refrigerated, and saturated air being heavier than air not saturated likewise remains in the open space in the can, thereby diminishing the evaporation loss to the comestibles.

It is a well known fact when comestibles are refrigerated in the presence of air that the air while absorbing heat from the comestibles also absorbs an appreciable quantity of moisture from the comestibles, which moisture will become deposited upon any colder bodies such as the refrigerating coils or surfaces in the presence of the air. This evaporation of moisture results in a loss of weight in the comestible refrigerated. This loss of weight in many cases amounts to a measurable percentage of the original weight of the comestible and consequently from a commercial standpoint is very undesirable. Furthermore the loss of moisture to a comestible in many cases may be detrimental to its quality.

In accordance with my present invention as above described, the presence of air in proximity of the freezing comestibles is substantially minimized by tightly packing the comestibles within the container. Furthermore, as above stated, the comestibles may be very rapidly frozen by my process since a very rapid transfer of heat to the refrigerant is possible through the closely packed comestible units within the narrow container and because of the fact that the comestible units being closely packed in the container, large areas of contact must exist with the container walls and between each of the comestible units and through which contact areas heat is transferred many times more rapidly than through air.

The use of comparatively deep containers as illustrated, within which the comestible may be lowered well below the surface of the refrigerant further insures very rapid freezing since the space containing the comestible may be then practically wholly surrounded by the refrigerant. The use of the deep narrow containers furthermore tends to prevent any undesirable circulation of air around the comestible units.

I have found the deep elongated narrow container as illustrated, to be especially suited to the freezing of a plurality of fish for the added reason that such relative dimensions particularly adapt the container to the reception of diversely but always closely packed fish, and for the reason that its relative proportions are such as to present the largest practical surface area of solidly packed comestibles exposed to rapid refrigeration action. I have further found that the weight of the superposed fish in such an upright container also aids in retaining the fish in a closely packed relation.

As a result of this rapid freezing, the period is greatly diminished during which the transfer of moisture may take place from the comestible to adjacent colder bodies through the medium of such air spaces as do exist. Accordingly, both as a result of the rapid freezing and the minimizing of the air spaces in accordance with my process, the undesirable loss of moisture to the comestible is greatly diminished. In practice I have found that when the process embodying my invention is followed, there is no loss of weight of commercial importance resulting from the evaporation of moisture.

It is to be noted that the pan 8 and the cover 13 do not form a water-tight closure and, as a consequence, may be very easily and economically constructed. At the same time, the telescopic pan 8 and the cover 13, in combination with the can 1, serve as the equivalent of a water-tight container which permits of the treating of comestibles by immersion in a refrigerating bath. By means of the combination of can 1 and the pan 8, with or without the cover 13, I secure substantially the equivalent of a water-tight container wherein comestibles to be frozen are disposed and the whole then being submersed in the refrigerating bath. Moreover, the comestibles are properly packed expeditiously and handled with little labor.

The false bottom 11 is sometimes desirable since fish, when being treated, are sometimes first gutted and the blood exuding therefrom will collect in the bottom of the pan 8 when it is disposed vertically for freezing. This may cause the mold or cake to be slightly discolored at its lower extremity. In order to prevent this discoloration from appearing in the mold that is to be marketed, the false bottom 11 is arranged which permits of the lower discolored edge of the mold to be broken off when the mold is removed from the pan 8. In many instances, it may not be necessary or advisable to use the false bottom 11.

Again, in arranging the fish within the pan 8 it may be desirable to detach the lower flange 14 of the pan. The cover 13 is likewise provided with an open end 14ᵃ corresponding to the end 14 of the pan 8. In this circumstance, the fish are arranged and packed in the pan 8 while the same is held slightly reclined. Then the cover 13 may or may not be applied. While the pan 8 is held in a nearly horizontal position, it is slid into the can 1 which is also held nearly horizontal. After the pan 8 has been positioned in the can 1, the whole is then held upright and the pan 8 and the cover 13, if employed, are withdrawn from the can 1 by means of the handle 9. This places the fish directly in the can 1 and very tightly packed without large interposed air spaces and without material disarrangement. In this instance, the pan 8 may be considered as resembling a scoop shovel whereby the comestibles or fish may be tightly and intimately packed without inconvenience into a can 1 which is subsequently disposed in the frigerant. When the pan 8 is used as a shovel, as hereinbefore described, the upper level of the comestibles should not extend above the level indicated at B since it is preferable to have the level of the refrigerant a substantial distance above the level of the comestibles being treated.

The trowel-like device illustrated in Fig. 4 is useful in flattening and smoothing the surface of the comestibles or fish when they have been inserted in the can 1, and the pan 8 (and cover 13) removed. The trowel 4 is utilized in a careful manner in order that the fish may not become bruised, it being desirable in all instances to have the frozen comestibles or fish resemble as near as possible fresh articles.

In order to handle a number of cans 1 expeditiously and conveniently at the same time, I have provided a rack which is illustrated in Fig. 8, that comprises a framework having a plurality of side-by-side spacers 15 arranged on frames 16 wherein the cans 1 are received. The lower edges of the cans 1 rest upon a framework 17 to which the frames 16 are secured. After the cans have been arranged in the rack, the whole, by means of an overhead crane or other suitable device may then be immersed in a refrigerant, the upper edges 3 of the cans, of course, extending above the level of the refrigerant as hereinbefore described.

Of course, it is apparent that after the comestibles have been positioned in the can 1, water may be poured in the can which will fill up all the air spaces and result in the production of a frozen cake of ice having the comestibles imbedded therein.

While I have shown and described an embodiment of my invention, it is to be understood that I do not desire to be limited to the specific method and apparatus mentioned, but that I desire only such limitations to be imposed upon my invention as are set forth in the appended claims.

Having thus described my invention, what I claim as new and desire to secure by Letters Patent of the U. S. is:—

1. The method of handling comestibles, such as fish and the like, for refrigerating them substantially en masse which consists in arranging the comestibles in regular formation to fill an open scoop-shaped container, then placing said scoop-shaped container in the open end of a second upright thin-walled and water-tight container wherein said first container is fitted to slidingly engage therewith, and then immersing said second container in a refrigerant to a level not permitting the entry of the refrigerant into the second container but substantially on a par with or above the level of the comestibles contained therein.

2. An apparatus for handling comestibles comprising an open pan, a telescopic lid therefor, and a second water-tight can having an open end wherein said pan and lid may be inserted, said can having a tapering form longitudinally of its length and with and slidingly engaging with said pan and lid.

3. An apparatus for handling fish comprising an open scoop-shaped pan, a telescopic lid therefor, a can having an open end wherein said pan and lid are received in sliding engagement, and a perforated false bottom for the end of said can opposite to said open end.

4. An apparatus for handling comestibles comprising an open scoop-shaped pan and a water-tight can having an open end wherein said can may be inserted with a sliding fit, said can having a tapering form longitudinally of its length and adapted to be positioned uprightly in a liquid bath, the upper edge of said can extending substantially above the upper edge of said pan.

5. An apparatus for handling comestibles comprising an open scoop-shaped pan, a water-tight can having an open end wherein said pan may be inserted with a sliding fit, and a perforated false bottom for the end of said can opposite to said open end, said can having a tapering form longitudinally of its length and the upper edge thereof extending substantially above the upper edge of said pan when in position.

6. An apparatus for handling comestibles for refrigerating them comprising an open box-member with at least three upstanding side flanges, and a jacket receiver having an opening in one of its sides through which said box-member may be inserted into or withdrawn therefrom, said jacket receiver being tapered convergingly from its side having said opening and being water-tight on its other sides.

7. The process of freezing a plurality of fish without appreciable evaporation of moisture therefrom which consists in tightly packing the fish within a comparatively deep, elongated, narrow container and thereby sustantially minimizing air pockets within the container, and then immersing the container in a low temperature refrigerating liquid of a level not permitting the entry of the refrigerant into the container, but substantially on a par with or above the level of the comestible contained therein, whereby all parts of the fish may come into close proximity of the surrounding refrigerating liquid and whereby a rapid dissipation of heat takes place from the closely packed fish directly contacting with the container walls.

In testimony whereof, I have hereunto subscribed my name this 31st day of May, 1923.

PAUL W. PETERSEN.

Witnesses:
OSCAR J. SIMPSON,
C. E. BILL.